Figure 1:
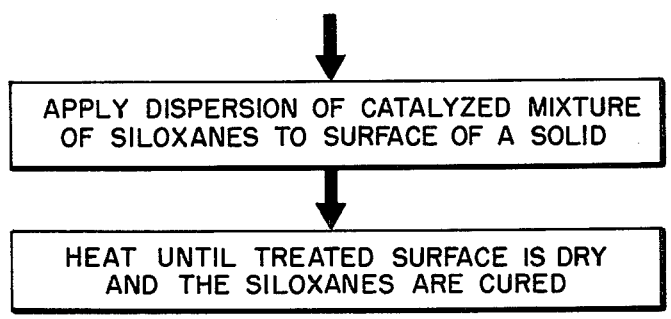

though of the United States Patent Office 3,050,411
Patented Aug. 21, 1962

3,050,411
RELEASE COATINGS COMPRISING THE REACTION PRODUCT OF 0.1–5 PERCENT METHYLHYDROGENPOLYSILOXANE AND 95–99.9 PERCENT PERFLUOROALKYLSILOXANE
Joseph W. Keil, Midland, Mich., assignor to Dow Corning Corporation, Midland, Mich., a corporation of Michigan
Filed Sept. 16, 1959, Ser. No. 840,231
15 Claims. (Cl. 117—68.5)

This invention relates to coating compositions effective for releasing silicone adhesives, methods for their use and articles so coated.

Silicone release agents are now well-known and commercially accepted. However, to this date neither the presently known silicone release agents nor organic release agents have been effective in rendering surfaces non-adherent to hydrocarbon-substituted silicone adhesives such as those described in U.S. Patents 2,736,721, issued February 28, 1956, and 2,814,601, issued November 26, 1957. While this is highly creditable to these adhesives, it presents a problem in their handling both in bulk and in a finished product, e.g. an adhesive tape.

It is the primary object of this invention to provide a composition which can be used as a coating and to which silicone adhesives such as those in the above-cited patents adhere at best only slightly.

For such a release composition to be of practical value it should not transfer from the coated surface to the adhesive since the effectiveness of the adhesive would then be reduced. For example, in an adhesive tape employing a hydrocarbon-substituted silicone adhesive such as those described in the above patents it is desirable that the non-adhesive side of the tape be treated to permit easy unrolling of the tape from the usual commercial roll. At the same time it is desirable that the release coating does not transfer to the adhesive thereby reducing in part its adhesive qualities. This type of transfer is prevented or markedly reduced by curing the release composition. Generally, the degree of cure is related inversely to the transferability of the release composition.

Another object of this invention is to provide a release composition which when properly cured on a surface will not transfer from that surface. These objects are accomplished by this invention.

This invention relates specifically to a curable composition of matter which comprises a mixture consisting essentially of (1) from 0.1 to less than 5 percent by weight methylhydrogenpolysiloxane and (2) from more than 95 to 99.9 percent by weight of a siloxane having a viscosity of at least 5000 cs. at 25° C. and consisting of a least 90 mol percent units of the formula $$RCH_2CH_2Si(CH_3)O$$

in which each R is a perfluoroalkyl of less than four carbon atoms and not more than 10 mol percent units of the formula

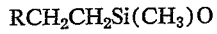

in which each R' is a monovalent hydrocarbon radical of less than seven carbon atoms and each $n$ has a value of 1, 2 or 3, siloxane (2) having an average degree of substitution ranging from 1.9 to 2.0, substantially all of the molecules in siloxane (2) having attached thereto at least two silicon-bonded radicals selected from the group consisting of hydroxyl and alkoxyl radicals of less than 5 carbon atoms.

The compositions of this invention are mixtures of siloxanes (1) and (2). Siloxane (1) is methylhydrogenpolysiloxane. This term includes both siloxanes of the unit formula MeHSiO and copolymers of MeHSiO and Me₃SiO units. The viscosity of the methylhydrogenpolysiloxane is not critical.

The methylhydrogenpolysiloxane must be employed in an amount from 0.1 to less than 5 percent, preferably about 3 percent, by weight based on the weight of the total siloxane. If the amount of methylhydrogenpolysiloxane is 5 percent or greater, inferior release is obtained. If less than 0.1 percent by weight is used, the curing of the siloxane mixture on a base member is too slow to be of practical importance. Insufficiently cured siloxanes give poor release and transfer from surfaces coated therewith.

Siloxane (2) is a beta-perfluoroalkylethylmethylpolysiloxane in which each perfluoroalkyl radical R can be the trifluoromethyl, pentafluoroethyl or heptafluoropropyl radicals. These siloxanes can be prepared by the polymerization of hydrolyzates of the corresponding dichlorosilanes employing alkaline and acidic catalysts according to standard practice. The dichlorosilanes can be prepared by esterifying a perfluoro acid of the formula RCOOH with ethanol, reacting the ethyl ester with a mixture of methyl Grignard and isopropyl Grignard to give an alcohol of the formula

dehydrating the alcohol by heating it with P₂O₅ to give the olefin RCH=CH₂ and reacting the olefin with MeHSiCl₂ to give

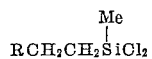

Siloxane (2) can be a homopolymer or a copolymer of the fluorine-containing siloxane units or it can be a copolymer with no more than 10 mol percent units of the formula

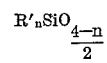

in which R' and $n$ are as defined above.

More specifically, each R' can be an alkyl radical such as the methyl, ethyl, isopropyl, t-butyl or hexyl radical; an alkenyl radical such as the vinyl, allyl or hexadienyl radical; a cycloaliphatic radical such as the cyclopentenyl or cyclohexyl radical or the phenyl radical. Each $n$ can be 1, 2 or 3 introducing polyfunctionality, polymer chain links or polymer endblockers respectively. However, the average degree of substitution, i.e. the average number of organic radicals attached to each silicon atom by a Si—C linkage, of siloxane (2) should range from 1.9 to 2.0.

These copolymers can be prepared by cohydrolysis of the corresponding chlorosilanes or by the alkaline copolymerization of the corresponding cyclic trisiloxanes. The preparation of siloxane (2) is more fully described in copending application Serial No. 594,113, filed June 27, 1956, by Eric D. Brown.

Siloxane (2) can be either hydroxylated, alkoxylated or both. The alkoxyl groups consist of the methoxyl, ethoxyl, propoxyl and butoxyl groups. The presence of alkoxyl radicals stabilizes the ultimate mixture by substantially reducing the tendency of the ultimate mixture to gel on standing. The fastest curing mixture employs a hydroxylated siloxane at the sacrifice of shelf-life or bathlife. The most stable mixture employs a completely alkoxylated siloxane at the sacrifice of cure time. Generally the relative amounts of hydroxyl and alkoxyl groups in this siloxane ingredient are adjusted to give what are considered to be optimum properties for each set of application conditions.

In all cases substantially all of the molecules should have at least a total of two silicon-bonded hydroxyl and/or alkoxyl groups attached thereto. The term "substantially all" means that there may be present small amounts of siloxanes which contain neither silicon-bonded hydroxyl nor alkoxyl groups and which are normally present in the production of hydroxylated and/or alkoxylated siloxanes. However, if the amount of non-hydroxylated non-alkoxylated siloxane exceeds 5 to 10 percent, poor curing and transfer of the siloxane results.

Siloxane (2) can range in viscosity from 5000 cs. at 25° C. up to non-flowing soluble gums.

The mixture of siloxanes (1) and (2) can be applied to a solid surface in a solvent free state or as a dispersion. It is preferably employed as an emulsion containing from 1 to 10 percent by weight of the siloxane mixture. The mixture is then cured by heating.

In order to hasten the cure it is desirable to employ a curing catalyst. The preferred catalysts are the metal salts of carboxylic acids such as lead octoate, dibutyltindiacetate, dibutyltindilaurate, zinc octoate, ferric octoate, ferric naphthenate, cobalt naphthenate and the like.

It should be understood that when the catalyst is added to the emulsion the latter must be used in a reasonable length of time. Otherwise the setting of the siloxane will occur in the emulsion resulting in an undesirable product. The applicant has found, however, that if small amounts of carboxylic acids are added to the emulsion, the stability is greatly increased. For example, a typical emulsion employing a hydroxylated siloxane and containing a dibutyltindioctoate catalyst is stable for about 30 minutes. In the presence of say 1 percent acetic acid the same emulsion is stable for at least 8 hours. The stabilization here applies to the methylhydrogenpolysiloxane component. To achieve such stabilization any carboxylic acid may be employed in amount from .01 to 2 percent by weight acid based on the weight of the emulsion. Preferably, however, the acid should be volatile so that it is removed along with the water when a solid surface is treated and the siloxane is cured. For that reason the preferred acids are acetic, formic, propionic, octanoic, 2-ethylhexoic and the like. The use of alkoxylated siloxanes reduces the need for these acid stabilizers.

The compositions of this invention are applicable to any solid inorganic materials such as glass, asbestos or mica or organic materials such as nylon, Orlon, terephthalic-alkylene glycol esters, polyethylene-terephthalate resin, cellophane, vinyl plastics and the like, but they are most advantageously employed for treating paper such as glassine, parchment, kraft, tissue and the like, and paper products such as pasteboard and corrugated paper. In such treatment at least 0.1 percent by weight of the siloxane based on the weight of the material treated should be applied to the surface to be treated, e.g. paper.

Paper sheets can be treated on one or both sides at the size press of a paper machine. The paper can then be passed over drying drums where the siloxane mixture cures and then can be rolled up for storage. Such treated paper or similarly treated plastic sheets are ideal for use as interleaving sheets in rolls of silicone adhesive tape. Alternatively the back of the tape itself can be so treated.

Figure 2:
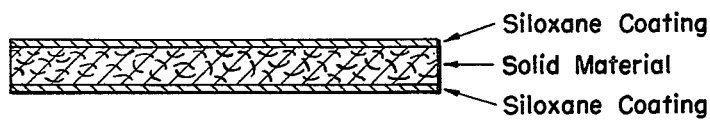
Figure 3:
Figure 4:
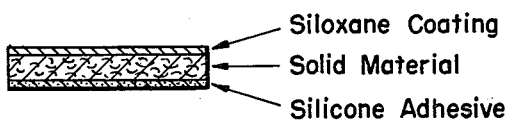

The uses of the compositions of this invention are illustrated in the accompanying drawing. FIGURE 1 is a simple flow sheet illustrating the two-step method of this invention. FIGURE 2 is a sectional view of a sheet of material such as paper, coated on both sides with the siloxane composition of this invention. FIGURE 3 is a sectional view of a sheet of material such as paper coated only on one side with the siloxane composition of this invention. FIGURE 4 is a sectional view of an adhesive tape consisting of a sheet of backing material, e.g. paper, coated on one side with a layer of silicone adhesive and on the other side with the siloxane release composition of this invention.

The following examples are illustrative only and should not be construed as limiting the invention which is properly delineated in the appended claims. All viscosities were measured at 25° C.

*Example 1*

A mixture of 97 parts by weight of a 49,000 cps. hydroxy-endblocked 3,3,3 - trifluoropropylmethylpolysiloxane, 3 parts by weight of trimethylsiloxy-endblocked methylhydrogenpolysiloxane and 6 parts by weight of a 50 percent by weight solution in xylene of dibutyltin di-2-ethylhexoate was metered on a sheet A of glassine paper and cured for 2 minutes at 250° F. The percent by weight pickup of siloxane solids based on the paper weight was 5 percent.

Another sheet B of the same type of glassine paper was similarly coated except that a $20 \times 10^6$ cps. hydroxy-endblocked dimethylpolysiloxane gum in a xylene-heptane mixture was substituted for the 3,3,3-trifluoropropylmethylpolysiloxane.

The adhesive tape employed in this test was a polyethylene-terephthalate resin film coated with an organopolysiloxane adhesive consisting essentially of a peroxide-cured mixture of 50 percent by weight of a copolymer of trimethylsiloxane units and $SiO_2$ units having a methyl-to-silicon ratio of approximately 1.2 and 50 percent by weight of a trimethylsiloxy-endblocked dimethylpolysiloxane gum.

The comparative release properties of treated papers A and B were determined by pressing strips of the above-described adhesive tape against the treated paper surfaces with a pressure of quarter pound per square inch for 20 hours at room temperature. The tapes were then pulled at an angle of 180° to the surface of the paper at a rate of 12 inches per minute. The force required to do this was determined by means of a spring balance and is expressed as grams per inch of tape width.

The degree of siloxane transfer from the treated papers to the tapes was measured by measuring the subsequent adhesion of the tapes from the release tests to a metal plate. This was done in each case by pressing each tape from the above release tests against a metal plate. The tape was then pulled at an angle of 180° to the surface of the plate at a rate of 12 inches per minute. The force required to do this was determined by means of a spring balance and is expressed as grams per inch of width.

The results were as follows:

| Treated paper | Release (gm./in.) | Subsequent adhesion (gm./in.) |
| --- | --- | --- |
| A | 60 | 770 |
| B | 800 | 400 |
| Control | | 800 |

*Example 2*

When an emulsion consisting of 94.7 percent by weight water, 0.05 percent by weight of trimethylsiloxy-endblocked methylhydrogenpolysiloxane, 0.1 percent by weight of polyvinyl alcohol, 0.2 percent by weight dibutyltindiacetate and 4.95 percent by weight of 10,000 cps. 3,3,3-trifluoropropylmethylpolysiloxane in which 60 percent of the endblocking groups were silicon-bonded hydroxyl radicals and the other 40 percent of the endblocking groups were silicon-bonded methoxyl radicals is sprayed on parchment paper, glass cloth and polyethylene-terephthalate resin film in the amount of 0.5 percent by weight and is subsequently cured for 2 minutes at 235° F., each of the treated surfaces is essentially non-adherent to silicon adhesives.

Example 3

When the following polysiloxanes are substituted for the 49,000 cps. hydroxy-endblocked 3,3,3-trifluoropropylmethylpolysiloxane in Example 1, similar results are obtained.

A 500,000 cps. methoxy-endblocked copolymer of 95 mol percent $C_2F_5CH_2CH_2SiMeO$ units, 4.50 mol percent diphenylsiloxane units, 0.25 mol percent methylvinylsiloxane units and 0.25 mol percent monomethylsiloxane units.

A mixture of 80 percent by weight of 7000 cps. 3,3,3-trifluoropropylmethylpolysiloxane in which 60 percent of the endblockers are methoxyl groups and 40 percent of the endblockers are hydroxyl groups and 20 percent by weight of 10,000,000 cps. hydroxyl-endblocked 3,3,4,4,5,5,5-heptafluoropentylmethylpolysiloxane gum.

That which is claimed is:

1. A method of rendering the surface of a solid material non-adherent to silicone adhesives which comprises applying to said surface a dispersion of a mixture consisting essentially of (1) from 0.1 to less than 5% by weight methylhydrogenpolysiloxane, (2) from more than 95 to 99.9 percent by weight of a siloxane having a viscosity of at least 5000 cs. at 25° C. and consisting of at least 90 mol percent units of the formula $$RCH_2CH_2Si(CH_3)O$$

in which each R is a perfluoroalkyl of less than four carbon atoms and not more than 10 mol percent units of the formula $$R'_nSiO_{\frac{4-n}{2}}$$

in which each R' is a monovalent hydrocarbon radical of less than seven carbon atoms and each $n$ has a value selected from the group consisting of 1, 2, and 3, siloxane (2) having an average degree of substitution ranging from 1.9 to 2.0, substantially all of the molecules in siloxane (2) having attached thereto at least two silicon-bonded radicals selected from the group consisting of hydroxyl and alkoxyl radicals of less than 5 carbon atoms, and (3) a curing catalyst and thereafter heating the treated surface to dry it and cure the siloxanes.

2. The method of claim 1 wherein siloxane (2) is made up of linear solecules endblocked with the described silicon-bonded radicals selected from the group consisting of hydroxyl and alkoxyl radicals of less than 5 carbon atoms.

3. The method of claim 1 wherein substantially all of the molecules of siloxane (2) have a total of at least two silicon-bonded hydroxyl and methoxyl groups attached thereto.

4. The method of claim 1 wherein siloxane (2) is a homopolymer of $CF_3CH_2CH_2Si(CH_3)O$ units.

5. An article of manufacture comprising a solid material coated with at least 0.1 percent by weight of a siloxane coating prepared by curing a mixture consisting essentially of (1) from 0.1 to less than 5 percent by weight methylhydrogenpolysiloxane and (2) from more than 95 to 99.9 percent by weight of a siloxane having a viscosity of at least 5000 cs. at 25° C. and consisting of at least 90 mol percent units of the formula $$RCH_2CH_2Si(CH_3)O$$

in which each R is a perfluoroalkyl of less than four carbon atoms and not more than 10 mol percent units of the formula $$R'_nSiO_{\frac{4-n}{2}}$$

in which each R' is a monovalent hydrocarbon radical of less than seven carbon atoms and each $n$ has a value selected from the group consisting of 1, 2 and 3, siloxane (2) having an average degree of substitution ranging from 1.9 to 2.0, substantially all of the molecules in siloxane (2) having attached thereto at least two silicon-bonded radicals selected from the group consisting of hydroxyl and alkoxyl radicals of less than 5 carbon atoms.

6. The article of manufacture of claim 5 wherein siloxane (2) is a homopolymer of $$CF_3CH_2CH_2Si(CH_3)O$$

units.

7. The article of claim 5 wherein the solid material is a flexible sheet.

8. The article of claim 7 wherein the flexible sheet is coated on one side only.

9. A curable composition of matter which comprises a mixture consisting essentially of (1) from 0.1 to less than 5 percent by weight methylhydrogenpolysiloxane and (2) from more than 95 to 99.9 percent by weight of a siloxane having a viscosity of at least 5000 cs. at 25° C. and consisting of at least 90 mol percent units of the formula $RCH_2CH_2Si(CH_3)O$ in which each R is a perfluoroalkyl of less than four carbon atoms and not more than 10 mol percent units of the formula $$R'_nSiO_{\frac{4-n}{2}}$$

in which each R' is a monovalent hydrocarbon radical of less than seven carbon atoms and each $n$ has a value selected from the group consisting of 1, 2 and 3, siloxane (2) having an average degree of substitution ranging from 1.9 to 2.0, substantially all of the molecules in siloxane (2) having attached thereto at least two silicon-bonded radicals selected from the group consisting of hydroxyl and alkoxyl radicals of less than 5 carbon atoms.

10. The composition of claim 9 wherein siloxane (2) is made up of linear molecules endblocked with the described silicon-bonded radicals selected from the group consisting of hydroxyl and alkoxyl radicals of less than 5 carbon atoms.

11. The composition of claim 9 wherein substantially all of the molecules of siloxane (2) have a total of at least two silicon-bonded hydroxyl and methoxyl groups attached thereto.

12. The composition of claim 9 wherein siloxane (2) is a homopolymer of $CF_3CH_2CH_2Si(CH_3)O$ units.

13. A composition of matter comprising the reaction product of (1) from 0.1 to less than 5 percent by weight methylhydrogenpolysiloxane, (2) from more than 95 to 99.9 percent by weight of a siloxane having a viscosity of at least 5000 cs. at 25° C. and consisting of at least 90 mol percent units of the formula $$RCH_2CH_2Si(CH_3)O$$

in which each R is a perfluoroalkyl of less than four carbon atoms and not more than 10 mol percent units of the formula $$R'_nSiO_{\frac{4-n}{2}}$$

in which each R' is a monovalent hydrocarbon radical of less than seven carbon atoms and each $n$ has a value selected from the group consisting of 1, 2 and 3, siloxane (2) having an average degree of substitution ranging from 1.9 to 2.0, substantially all of the molecules in siloxane (2) having attached thereto at least two silicon-bonded radicals selected from the group consisting of hydroxyl and alkoxyl radicals of less than 5 carbon atoms, and (3) a curing catalyst.

14. The composition of claim 13 wherein siloxane (2) is a homopolymer of $CF_3CH_2CH_2Si(CH_3)O$ units.

15. An adhesive tape comprising a flexible sheet coated on one side with a silicone adhesive and coated on the other side with at least 0.1 percent by weight of a composition of matter comprising the reaction product of (1) from 0.1 to less than 5 percent by weight methylhydrogenpolysiloxane, (2) from more than 95 to 99.9 percent by weight of a siloxane having a viscosity of at least 5000 cs. at 25° C. and consisting of at least 90 mol percent units of the formula $RCH_2CH_2Si(CH_3)O$ in which each R is a perfluoroalkyl of less than four carbon atoms and not more than 10 mol percent units of the formula $$R'_n SiO_{\frac{4-n}{2}}$$

in which each R' is a monovalent hydrocarbon radical of less than seven carbon atoms and each $n$ has a value selected from the group consisting of 1, 2 and 3, siloxane (2) having an average degree of substitution ranging from 1.9 to 2.0, substantially all of the molecules in siloxane (2) having attached thereto at least two silicon-bonded radicals selected from the group consisting of hydroxyl and alkoxyl radicals of less than 5 carbon atoms, and (3) a curing catalyst.

References Cited in the file of this patent

UNITED STATES PATENTS

| | | |
|---|---|---|
| 2,588,393 | Kauppi | Mar. 11, 1952 |
| 2,882,183 | Bond et al. | April 14, 1959 |
| 2,927,908 | Konkle et al. | Mar. 8, 1960 |